US008192115B2

(12) United States Patent
Meidar et al.

(10) Patent No.: US 8,192,115 B2
(45) Date of Patent: Jun. 5, 2012

(54) MACHINE TOOL WITH AT LEAST ONE SLIDING DOOR

(75) Inventors: Moshe Israel Meidar, New York, NY (US); Wolfgang Horn, Goeppingen (DE); Gerhard Hommel, Geislingen (DE); Markus Gunzenhauser, Boehmenkirch (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 833 days.

(21) Appl. No.: 12/342,863

(22) Filed: Dec. 23, 2008

(65) Prior Publication Data
US 2009/0196702 A1 Aug. 6, 2009

Related U.S. Application Data

(63) Continuation of application No. PCT/EP2008/060869, filed on Aug. 20, 2008.

(30) Foreign Application Priority Data

Sep. 7, 2007 (DE) .......................... 10 2007 044 290

(51) Int. Cl.
*B23Q 11/08* (2006.01)

(52) U.S. Cl. ........ 409/134; 409/137; 409/235; 451/451; 74/608

(58) Field of Classification Search .................. 451/451; 409/134–137, 145, 167, 202, 206, 213, 235; 74/608, 609; 160/202, 223; *B23Q 11/08*
See application file for complete search history.

(56) References Cited

U.S. PATENT DOCUMENTS

| | | | |
|---|---|---|---|
| 4,742,609 A * | 5/1988 | Neumann .......................... 483/3 |
| 4,999,895 A * | 3/1991 | Hirose et al. .................... 29/33 P |
| 6,682,276 B2 * | 1/2004 | Harami et al. ................. 409/134 |
| 6,884,009 B2 * | 4/2005 | Maeda ........................... 409/134 |
| 6,918,719 B2 * | 7/2005 | Yasumatsuya ................. 409/137 |
| 7,018,147 B2 * | 3/2006 | Hiramoto et al. ............. 409/134 |
| 7,226,403 B2 * | 6/2007 | Konvicka et al. ............... 483/14 |
| 7,547,270 B1 * | 6/2009 | Mischler et al. .................. 483/3 |
| 7,721,398 B2 * | 5/2010 | Bernhard et al. .............. 29/33 P |
| 2002/0028118 A1 * | 3/2002 | Laur et al. ..................... 409/132 |
| 2004/0102297 A1 | 5/2004 | Quak et al. |

(Continued)

FOREIGN PATENT DOCUMENTS

DE 3411394 A1 * 10/1985

(Continued)

OTHER PUBLICATIONS

English translation of International Preliminary Report on Patentability and Written Opinion of corresponding international Application No. PCT/EP2008/060869, dated Apr. 7, 2010.

*Primary Examiner* — Daniel Howell

(74) *Attorney, Agent, or Firm* — Alston & Bird LLP

(57) ABSTRACT

A machine tool is provided. The machine tool can comprise a machine frame, at least one tool holder device which is held for movement on the machine frame, a work space in which workpieces are machinable, a work space cladding, at least one workpiece carriage which is displaceable on a path guiding device relative to the machine frame, the path guiding device being arranged alongside the work space, and at least one sliding door for access to the work space. The sliding door particularly can be arranged on the path guiding device of the at least one workpiece carriage.

37 Claims, 7 Drawing Sheets

U.S. PATENT DOCUMENTS

| | | |
|---|---|---|
| 2005/0031425 A1 | 2/2005 | Hiramoto et al. |
| 2005/0095074 A1 | 5/2005 | Hacker et al. |
| 2008/0271304 A1 | 11/2008 | Grossmann |

FOREIGN PATENT DOCUMENTS

| | | | |
|---|---|---|---|
| DE | 4117699 | A * | 12/1992 |
| DE | 20 2006 009 653 U1 | | 8/2006 |
| EP | 0614724 | | 9/1994 |
| EP | 1 413 393 A2 | | 4/2004 |
| FR | 2 711 569 | | 5/1995 |
| JP | 63062636 | A * | 3/1988 |
| JP | 05060294 | A * | 3/1993 |

* cited by examiner

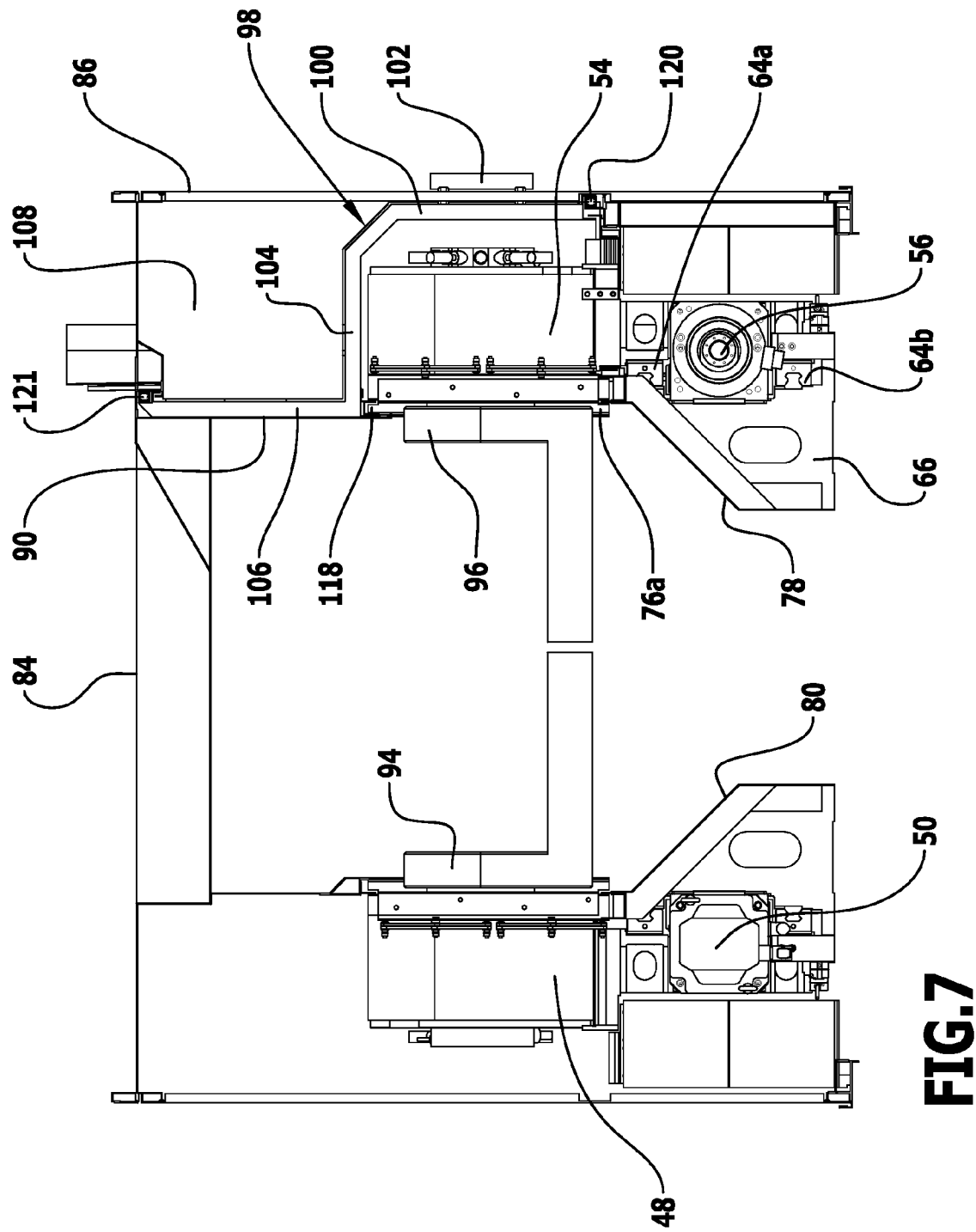

MACHINE TOOL WITH AT LEAST ONE SLIDING DOOR

CROSS-REFERENCE TO RELATED APPLICATIONS

The present application is a continuation of International Application Number PCT/EP2008/060869, filed Aug. 20, 2008, which claims priority to German Patent Application No. 102007044290.6, filed Sep. 7, 2007, both of which are incorporated herein by reference in their entirety.

BACKGROUND OF THE INVENTION

The invention relates to a machine tool, comprising a machine frame, at least one tool holder device which is held for movement on the machine frame, a work space in which workpieces are machinable, a work space cladding, and at least one workpiece carriage which is held on a path guiding device for displacement relative to the machine frame.

A machine tool is known from EP 0 614 724 B1, wherein a tool holder arranged on a machine frame is displaceable by means of carriages along a first axis and along an axis extending transversely to the first axis. A workpiece holder is held on a carriage which is displaceable in the third direction transversely to the first and second directions.

A machine tool with a workpiece holder which is rotatable about an axis of rotation is known from DE 100 49 810 A1. A guide for the headstock is a component of a rectangular frame which encloses a window in which the headstock is movable. The window has a louver with an opening which adapts to the position of the headstock.

An arrangement structure of a machine tool is known from DE 10 2004 034 171 A1.

A machining center with a circumferential protective cladding which is attached to a machine base and has a wide feed opening on a longitudinal side thereof is known from DE 20 2006 009 653 U1.

SUMMARY OF THE INVENTION

In accordance with the present invention, a machine tool designed for easy maintenance is provided.

In accordance with an embodiment of the invention, the path guiding device is arranged alongside the work space, and at least one sliding door for access to the work space is arranged on the path guiding device of the at least one workpiece carriage.

A large work space is made available by the arrangement of the at least one path guiding device at the side. Workpieces can be introduced into the work space by front loading or top loading. Furthermore, the path guiding device can thereby be encapsulated in a simple way in relation to the work space.

An access to the work space from the side, which has a large opening surface area, is provided by the arrangement of at least one sliding door on the path guiding device. The path guiding device can be used as displacement guide or holder for a displacement guide for the sliding door. Maintenance and repair work may, for example, be carried out through the side access.

In particular, it is expedient for the at least one sliding door to be displaceable parallel to a direction of displacement of the at least one workpiece carriage. A simple constructional design is thereby obtained, and a large access opening into the work space is provided when the sliding door is open.

It is quite particularly advantageous for the at least one sliding door to delimit a transit space for passage of the corresponding workpiece carriage therethrough. During the displacement of the workpiece carriage in the work space the workpiece carriage can then move past the sliding door. The sliding door closes a relatively large opening for access to the work space. Furthermore, upon opening, the sliding door can be slid over the workpiece carriage. This also results in a simple constructional design.

It is expedient for the at least one sliding door to be arranged between a front end of the machine tool and the machine frame. The front end of the machine tool is that end which delimits the work space towards the front or towards which a tool side of the at least one tool holder device faces. Owing to this arrangement of the at least one sliding door, a large opening is made available for access to the work space from the side, for example, for maintenance and repair work.

It is quite particularly advantageous for a recessed area at which the at least one sliding door is arranged, at least in the closed position, to be provided at an outer side of the machine tool. Access to the work space is enabled in a simple way through the recessed area. In particular, a sliding door can be provided, which in one partial area thereof delimits the work space directly and in further partial areas thereof is arranged on the path guiding device.

It may be provided that at least one window and/or at least one door is arranged on the at least one sliding door. In particular, the at least one window and/or the at least one door is arranged on a partial area of the at least one sliding door, which directly faces the work space, i.e., which on an inner side delimits the work space. A direct access to the work space is thereby enabled through a "small" opening whose surface area is smaller than that of the opening closed by the at least one sliding door, for example, in order to observe the work space or to also perform "actions" in the work space without the whole sliding door having to be opened.

In particular, the at least one door arranged on the sliding door is itself a sliding door or a swing door. It can, therefore, be easily opened.

It is then advantageous for the at least one door to have an opening area that is located on the associated sliding door and, in particular, does not lie outside the sliding door. This again enables in a simple way displaceability of the sliding door arranged on the path guiding device.

It is expedient for the at least one sliding door to have a first door element which covers the path guiding device towards the outside space. In particular, this first door element is aligned at least approximately parallel to a vertical direction in relation to the direction of gravity. An outer side of the path guiding device in the area of the opening in a work space cladding or outer cladding, which is covered by the at least one sliding door, can thereby be covered off towards the outside.

The path guiding device then lies between the work space and the first door element, so that the first door element can cover the path guiding device off towards the outside space.

It is also expedient for the at least one sliding door to have a second door element which is arranged on and orientated transversely to the first door element, and which covers the path guiding device upwards in relation to the direction of gravity towards the outside space. The second door element is preferably aligned at least approximately horizontally (in relation to the direction of gravity). It covers the path guiding device upwards in relation to the direction of gravity at the access opening to the work space. In particular, it is arranged (when the at least one sliding door is closed) in a recessed area on an outer cladding of the machine tool.

The first door element preferably lies between the path guiding device and a roof portion of an area of the machine tool that is recessed in relation to the outside space. This provides a "tunnel opening" for access to the work space from the outside space, and the path guiding device can be easily encapsulated in relation to the work space and by an outer cladding in relation to the outside space.

It is also expedient for the at least one sliding door to have a third door element which is arranged on and orientated transversely to the second door element. In particular, the third door element delimits the work space directly.

It is advantageous for the third door element to extend as far as a roof portion of the work space cladding. The access opening to a work space, when the at least one sliding door is closed, can, therefore, be closed in an upper area in relation to the direction of gravity.

The machine tool can be designed in a constructionally simple way when the third door element is orientated at least approximately parallel to the first door element (and in spaced relation thereto). The third door element can, therefore, be guided in a simple way on a displacement guide and, for example, enter a space on the machine tool when the at least one sliding door is open.

It is expedient for at least one window and/or at least one door to be arranged on the third door element. The work space can, therefore, be accessed or the work space can be observed from the third door element through a "small" opening (in comparison with the access opening to the work space that can be opened or closed via the at least one sliding door).

In particular, the third door element delimits the work space, i.e., it has an inner side which directly delimits the work space, and an outer side which faces the outside space.

It is quite particularly advantageous for the at least one sliding door to be held for displacement on the path guiding device. The path guiding device is a holder for the displacement guide for the at least one sliding door. This results in a simple constructional design.

The work space can be encapsulated in a simple way in relation to the path guiding device when at least one movable slide, which covers the path guiding device off from the work space, is arranged on the at least one workpiece carriage and at an end area of the associated path guiding device. For example, the at least one movable slide is constructed like bellows or as lamella device, roller blind or link apron. It enables covering of the path guiding device and hence encapsulation in relation to the work space in each position of the associated workpiece carriage.

In particular, the at least one slide is arranged between the work space and a partial area of the at least one sliding door. The sequence in an outward lateral direction (in an x direction) starting from the work space is then work space, slide, sliding door.

It is quite particularly advantageous for a fixing device for fixing the at least one slide to the associated workpiece carriage and/or to the end area of the associated path guiding device to be so constructed that the fixing is releasable from the outside space when the at least one sliding door is open. The at least one slide can, therefore, be released at at least one side and so displaced that access is also possible in the area of the slide through the access opening. The access opening can thereby be enlarged.

It is also advantageous for the at least one sliding door, upon opening, to pass into an area behind an outer cladding of the machine tool. A "sunken" slide guide can thereby be realized. The area above the path guiding device has to be closed off from the work space anyway. This space can be used as resting place for the sliding door when it is open.

In particular, the path guiding device is arranged between a portion of the work space cladding and an outer cladding of the machine tool. The aforementioned portion of the work space cladding serves to encapsulate the work space in the direction towards the path guiding device. The outer cladding serves to encapsulate the machine tool in relation to the outside space. The path guiding device is arranged between these, so that, on the one hand, it is encapsulated in relation to the work space and, on the other hand, encapsulated in relation to the outside space.

It is expedient for the at least one sliding door, upon opening, to pass into a space between a work space cladding portion and the outer cladding. This results in an optimum use of space, and a corresponding displacement guide for the least one sliding door can be constructed in a simple way.

It is also expedient for a guiding device for sliding guidance of the at least one sliding door to be provided so as to enable opening and closing in a simple way. In particular, this guiding device comprises elements such as guide rails.

The machine tool can be implemented in a constructionally simple way when the guiding device is at least partially arranged or formed on the associated path guiding device. Elements of the path guiding device also serve as guide elements or at least as holders for guide elements of the guiding device for sliding guidance of the at least one sliding door.

For example, at least one guide rail for the at least one sliding door is provided, which is arranged or formed on a guide rail for at least one slide (for encapsulation of the path guiding device in relation to the work space). The at least one slide is connected to the at least one workpiece carriage.

It is expedient for at least one guide rail for the at least one sliding door to be provided, which is arranged at or in the vicinity of an outer side of the path guiding device of the at least one workpiece carriage. The at least one sliding door can, therefore, be positioned and displaced in a simple way on the path guiding device.

In one embodiment, the machine tool according to the invention comprises a first workpiece carriage which is displaceable on a first path guiding device, and a second workpiece carriage which is displaceable on a second path guiding device, and the work space lies between the first path guiding device and the second path guiding device. With such a machine tool, for example, two workpieces to be machined can be fed to the work space. It is, for example, also possible for a workpiece which has still to be machined to be held in readiness outside the work space while another workpiece which is guided on a corresponding workpiece carriage is being machined in the work space. It is also possible to clamp the first workpiece carriage and the second workpiece carriage together, for example, for machining larger workpieces.

In particular, a direction of displacement of the first workpiece carriage and a direction of displacement of the second workpiece carriage are parallel to each other.

A connecting device may be provided for clamping the first workpiece carriage and the second workpiece carriage together.

It is also expedient for the first workpiece carriage to have a first drive of its own associated with it, and for the second workpiece carriage to have a second drive of its own associated with it. The workpiece carriages are then individually controllable by a control device. It is also possible for the two drives to be synchronizable, for example, in order to move a clamped workpiece carriage combination. By allocating a drive of its own to each workpiece carriage with individual controllability, it is, for example, possible to perform workpiece loading/workpiece unloading during production time. While a workpiece held on the one workpiece carriage is being machined in the work space, a workpiece which has already been machined can be collected at a loading station outside the work space, and a new workpiece to be machined can be fed to and fixed on the other workpiece holder, and this is then held in a waiting position at the loading station. The workpiece exchange then takes place in parallel with the machining of another workpiece in the work space. It is expedient for the at least one tool holder device to be displaceable in at least a first direction and a second direction perpendicular to the first direction on the machine frame. It is possible for the tool holder device to also be displaceable in a third direction perpendicular to the first direction and perpendicular to the second direction.

For example, the machine frame which, in particular, is of stand-like or portal-like construction is arranged on a machine bed. The machine tool is placed on a base by means of the machine bed.

It is then also expedient for the at least one path guiding device to be arranged on the machine bed. The machine bed forms the "base" for positioning and fixing the at least one path guiding device.

It is also expedient for a workpiece holder which is rotatable about an axis of rotation to be arranged on the associated at least one workpiece carriage. This results in additional machining possibilities owing to additional orientation and positioning possibilities for a workpiece relative to a tool of the tool holder device.

The axis of rotation preferably lies transversely and, in particular, perpendicularly to a direction of displacement of the at least one workpiece carriage. This results in a simple constructional design. In particular, a corresponding drive for the rotational movement can be easily arranged on the associated workpiece carriage.

The following description of preferred embodiments serves in conjunction with the drawings to explain the invention in greater detail.

BRIEF DESCRIPTION OF THE DRAWINGS

FIG. 7 shows a front view of the partial area according to FIG. 2.

DETAILED DESCRIPTION OF THE INVENTION

Figure 1:
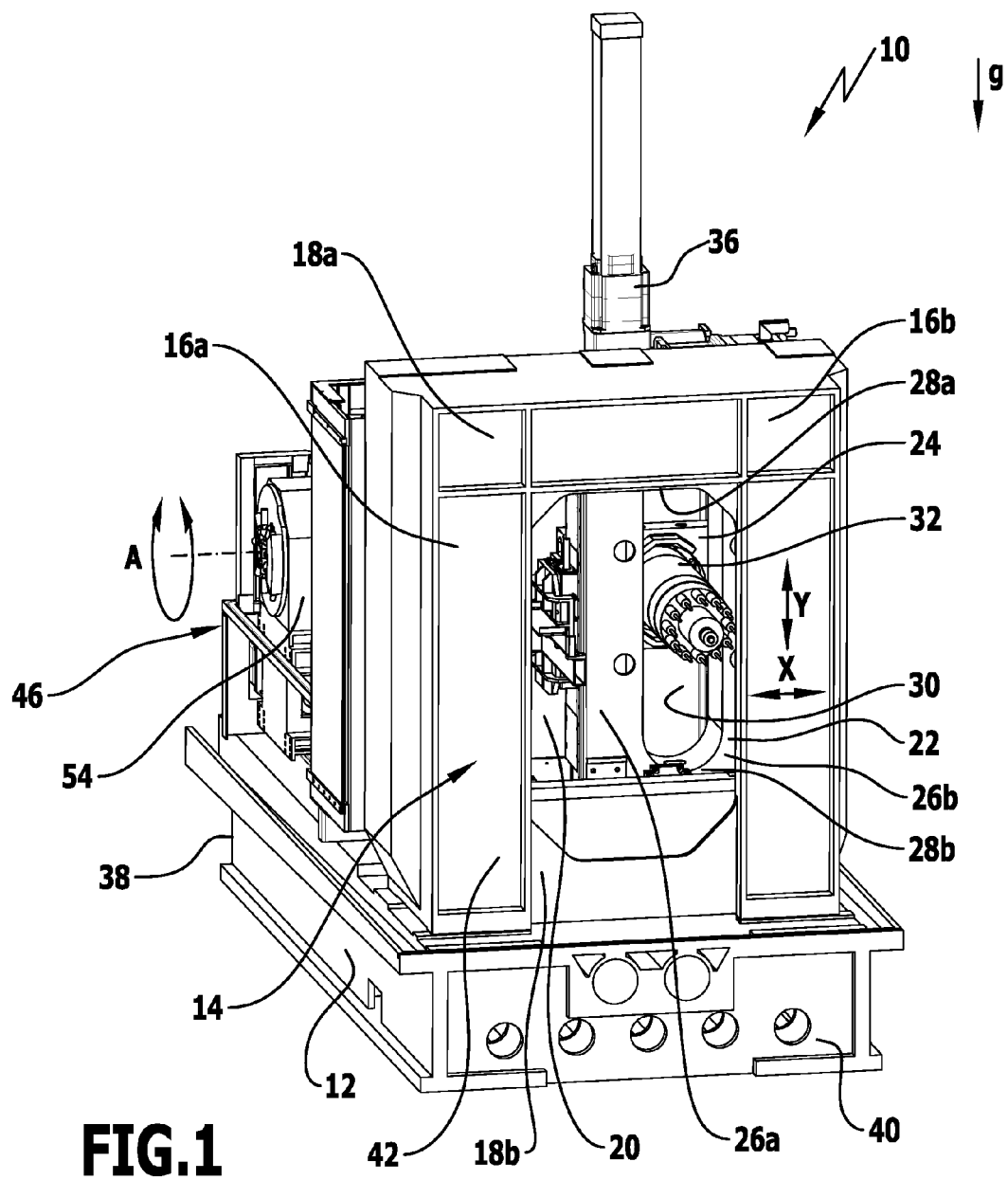
FIG. 1 shows a perspective representation of an embodiment of a machine tool according to the invention.

An embodiment of a machine tool according to the invention, shown and designated by 10 in FIG. 1 and shown in partial representations in FIGS. 2 to 7, comprises a machine bed 12. The machine bed 12 has an essentially parallelepipedal enveloping surface. The machine tool 10 is mounted by means of the machine bed 12 on a base.

A machine frame 14 in the form of a stand or portal is arranged on the machine bed 12. The machine frame 14 has spaced legs 16a, 16b which are orientated parallel to each other and, in particular, in a vertical direction (parallel to the direction of gravity). The legs 16a, 16b are joined by an upper connecting member 18a and by a lower connecting member 18b. The lower connecting member 18b faces the machine bed 12 or is fixed thereto.

A continuous opening 20 is formed between the legs 16a and 16b and between the connecting members 18a and 18b. A (tool holder) carriage 22 (first carriage 22) is guided in this opening 20. A first guiding device is arranged on the upper connecting member 18a and a second guiding device on the lower connecting member 18b. The machine frame 14 forms a carriage support for the first carriage 22. The carriage 22 is movable in a direction/opposite direction x on the machine frame 14. This x direction is preferably a horizontal direction in relation to the direction of gravity.

The first carriage 22 is driven for displacement thereof by a drive. This drive may, for example, be a ball screw drive or a linear motor drive.

A second carriage 24 is guided for displacement on the first carriage 22. A direction of displacement of the second carriage 24 on the first carriage 22, which thereby forms a carriage support for the second carriage 24, is perpendicular to the x direction. The corresponding y direction is a vertical direction in relation to the direction of gravity.

The first carriage 22 is of yoke-like construction with a first leg 26a and a second leg 26b spaced therefrom. The first leg 26a and the second leg 26b are aligned parallel to each other and orientated in vertical direction. They are joined to each other by an upper connecting member 28a and a lower connecting member 28b.

A continuous opening 30 is formed between the first leg 26a and the second leg 26b and between the upper connecting member 28a and the lower connecting member 28b. A partial area of the tool holder device 32 passes through this opening 30. In particular, the tool holder device 32 is configured as a tool spindle, which holds one or more, in particular, rotatable tools, and workpieces are machinable by a tool in a work space 34.

The second carriage 24 is driven for displacement thereof in the y direction by a drive 36. The drive 36 may, for example, be a ball screw drive or a linear motor drive.

It is, in principle, possible for a plurality of tool holder devices (corresponding to the tool holder device 32) to be arranged on the machine frame 14. These may be arranged on the same first carriage 22 and/or second carriage 24 or separate carriage devices (with first carriage 22 and second carriage 24) may be provided per tool holder device.

It is, in principle, also possible for a carriage for a z movability of the tool holder device 32 to be arranged on the second carriage 24. The z direction is perpendicular to the x direction and perpendicular to the y direction.

A machine construction in which the tool holder device is held on a carriage (the second carriage 24), which, in particular, is of yoke-shaped construction, the carriage support itself being a carriage (the first carriage 22), which is displaceable, is also referred to as box-in-box concept. This is described in EP 0 614 724 B1, which is incorporated herein by reference.

The machine tool 10 has a front end 38 and a rear end 40. The machine frame is arranged both at a spacing from the front end 38 and at a spacing from the rear end 40 on the machine bed 12. A cladding 42 may be arranged between the machine frame 14 and the rear end 40 on the machine frame 14. A control device for the machine tool 10 may be arranged in this area.

The work space 34 lies between the front end 38 and the machine frame 14.

The machine tool 10 comprises a first workpiece holder device 44 and a second workpiece holder device 46. The first workpiece holder device 44 has a first workpiece carriage 48 which has a first drive 50 of its own associated with it. The first drive 50 is, for example, a ball screw drive or a linear motor drive.

The first workpiece carriage 48 is displaceable in a direction of displacement 52 by the first drive 50. This direction of displacement 52 (z direction) is perpendicular to the x direction and to the y direction. The first workpiece carriage 48 and hence a workpiece held on it is displaceable in the z direction relative to the machine frame 14.

The second workpiece holder device 46 has in a corresponding manner a second workpiece carriage 54 which has a second drive 56 of its own associated with it.

The second drive 56 is, for example, a ball screw drive or a linear motor drive. The direction of displacement of the second workpiece carriage 54 is parallel to the direction of displacement 52 and hence also a z direction.

The first workpiece holder device 44 and the second workpiece holder device 46 are spaced from each other in the z direction. The work space 34 lies between the first workpiece holder device 44 and the second workpiece holder device 46.

It is, in principle, provided that the first workpiece carriage 48 and the second workpiece carriage 54 are displaceable separately. It may, however, also be provided that the first workpiece carriage 48 and the second workpiece carriage 54 are fixedly connected or clamped to each other by a connecting device, and a combination of the first workpiece carriage 48 and the second workpiece carriage 54 is therefore displaceable as a whole. To this end, the first drive 50 and the second drive 56 must then be correspondingly synchronized by a control device.

It is, in principle, also possible for only a common drive to be provided for the combination of first workpiece carriage 48 and second workpiece carriage 54. In this case, the first workpiece carriage 48 can then also be seen as first part of a joint slide and the second workpiece carriage as second part of a joint slide.

The first workpiece carriage 48 is guided for displacement on a first path guiding device designated in its entirety by 58. In a corresponding manner, the second workpiece carriage 54 is guided for displacement on a second path guiding device 60. The first path guiding device 58 and the second path guiding device 60 are preferably orientated substantially parallel to each other and extend from the front end 38 or from an area in the vicinity of the front end 38 to the machine frame 14.

The first path guiding device 58 and the second path guiding device 60 are arranged on the machine bed 12.

The path guiding devices 58 and 60 each comprise a guiding device 62 on which the corresponding workpiece carriage (48 or 54) is guided. To this end, the guiding device 62 comprises, for example, a first guide rail 64a and a second guide rail 64b spaced vertically therefrom. The guide rails 64a and 64b are orientated parallel to each other in z direction. They are held on the machine bed 12 by corresponding support elements 66, etc.

The first path guiding device 58 and the second path guiding device 60 delimit the work space 34 laterally at opposite sides thereof.

A first slide 68 and a second slide 70 are fixed to the respective workpiece carriage 48 and 54, respectively, on opposite sides. A slide is displaceable (in a partial area) with the associated workpiece carriage. It forms a cover. The first slide 68 is also fixed at an end area 72 of the associated path guiding device 58, 60 at or in the vicinity of the front end 38. The second slide 70 is fixed at an opposite side of the corresponding workpiece carriage and at an end area 74 of the corresponding path guiding device, which faces the machine frame 14. The first slide 68 and the second slide 70 are, for example, of bellows-like construction. They may, for example, also be constructed as lamella device, roller blind or link apron. They form covers for the work space in the direction towards the first path guiding device 58 and the second path guiding device 60. They are coupled to the corresponding workpiece carriages 48 and 54, respectively, so that in each displaced position of the workpiece carriage, the path guiding device 58 and 60, respectively, is encapsulated in relation to the work space 34.

When the corresponding workpiece carriage is moved in the direction of the front end 38, the first slide 68 is pushed together and the second slide 70 is pulled apart. Upon displacement in the opposite direction (towards the rear end 40) the second slide 70 is pushed together and the first slide 68 is pulled apart.

The first slide 68 and the second slide 70 are guided on a lower guide rail 76a and an upper guide rail 76b. The lower guide rail 76a is arranged at or in the vicinity of the first guide rail 64a of the guiding device 62. The upper guide rail 76b is spaced vertically from the lower guide rail 76a. The spacing between the lower guide rail 76a and the upper guide rail 76b corresponds substantially to the height of the corresponding workpiece carriage 48 and 54, respectively, above its guiding device 62.

Arranged between the first slide 68 and the second slide 70 and, in particular, between the lower guide rail 76a and the machine bed 12 is a respective cover 78 which covers off the path guiding device 58 and 60, respectively, below the guiding device 62, in particular, in the area of drive elements, from the work space 34. The respective cover 78 has an oblique surface 80 which is orientated along the z direction and is inclined at an acute angle to the x direction. Therefore, machining waste and, in particular, chips can slide down the oblique surface 80 and be removed by a chip removal device which, in particular, is arranged on the machine bed 12.

The cover 78 which is associated with the first path guiding device 58, and the corresponding cover which is associated with the second path guiding device 60 are spaced from each other.

The machine tool 10 has a work space cladding 82. This is not shown in FIG. 1. The work space 34 is encapsulated in relation to the outside space and to components of the machine tool by the work space cladding. The work space cladding 82 has a roof portion 84 which closes the work space upwards (in relation to the direction of gravity).

Arranged between the roof portion 84 and the slides 68 and 70 and, in particular, between the roof portion 84 and the rail 76b is a work space cladding portion 86, which protects the corresponding path guiding devices 58 and 60, respectively, from machining waste and the like entering from above. In particular, the work space cladding portion 86 is formed by one or more cladding panels which are fixed to the roof portion 84 and to the upper guide rail 76b.

Figure 2:
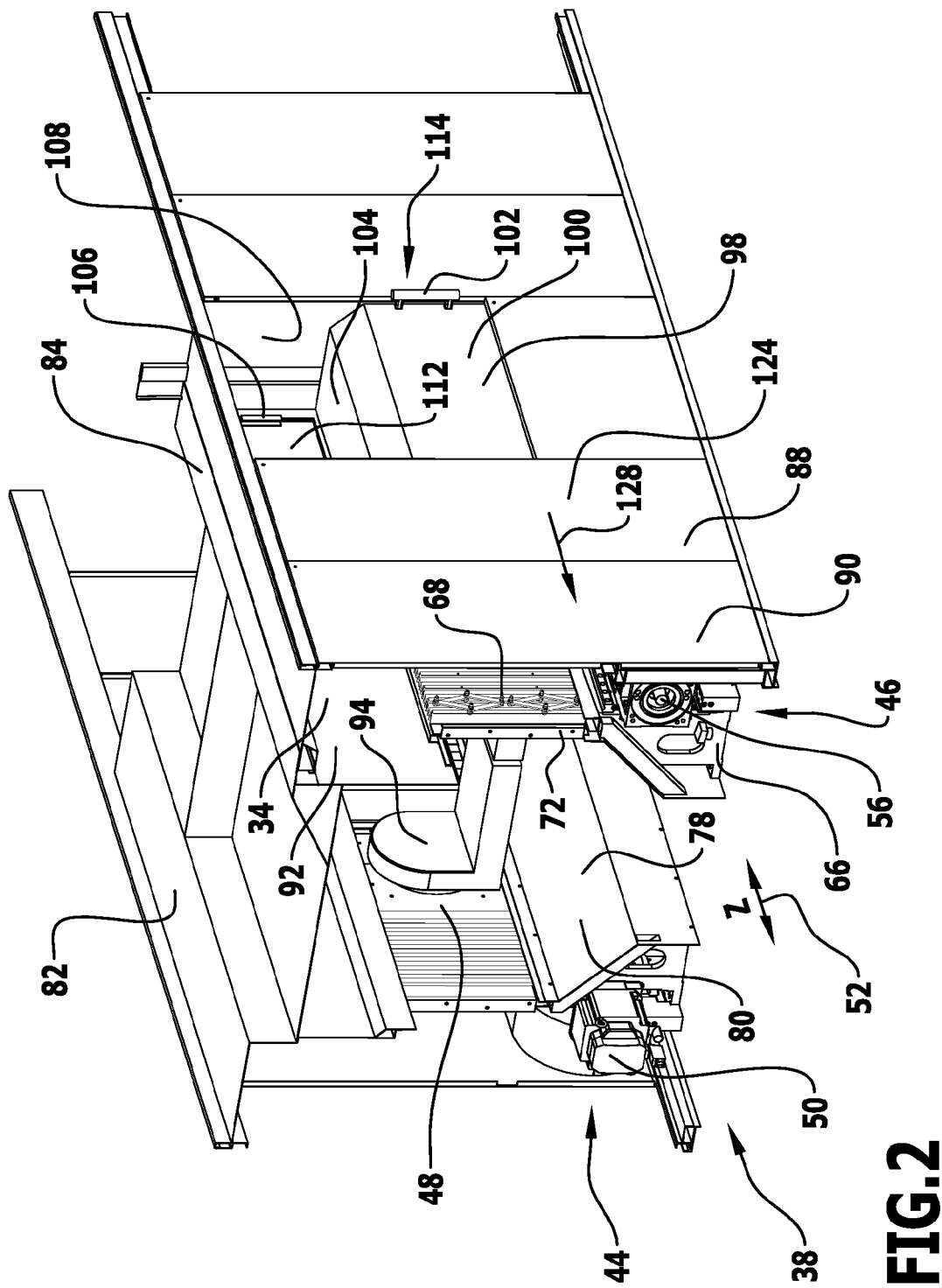
FIG. 2 shows a partial view of the area of a work space of the machine tool according to FIG. 1.
Figure 3:
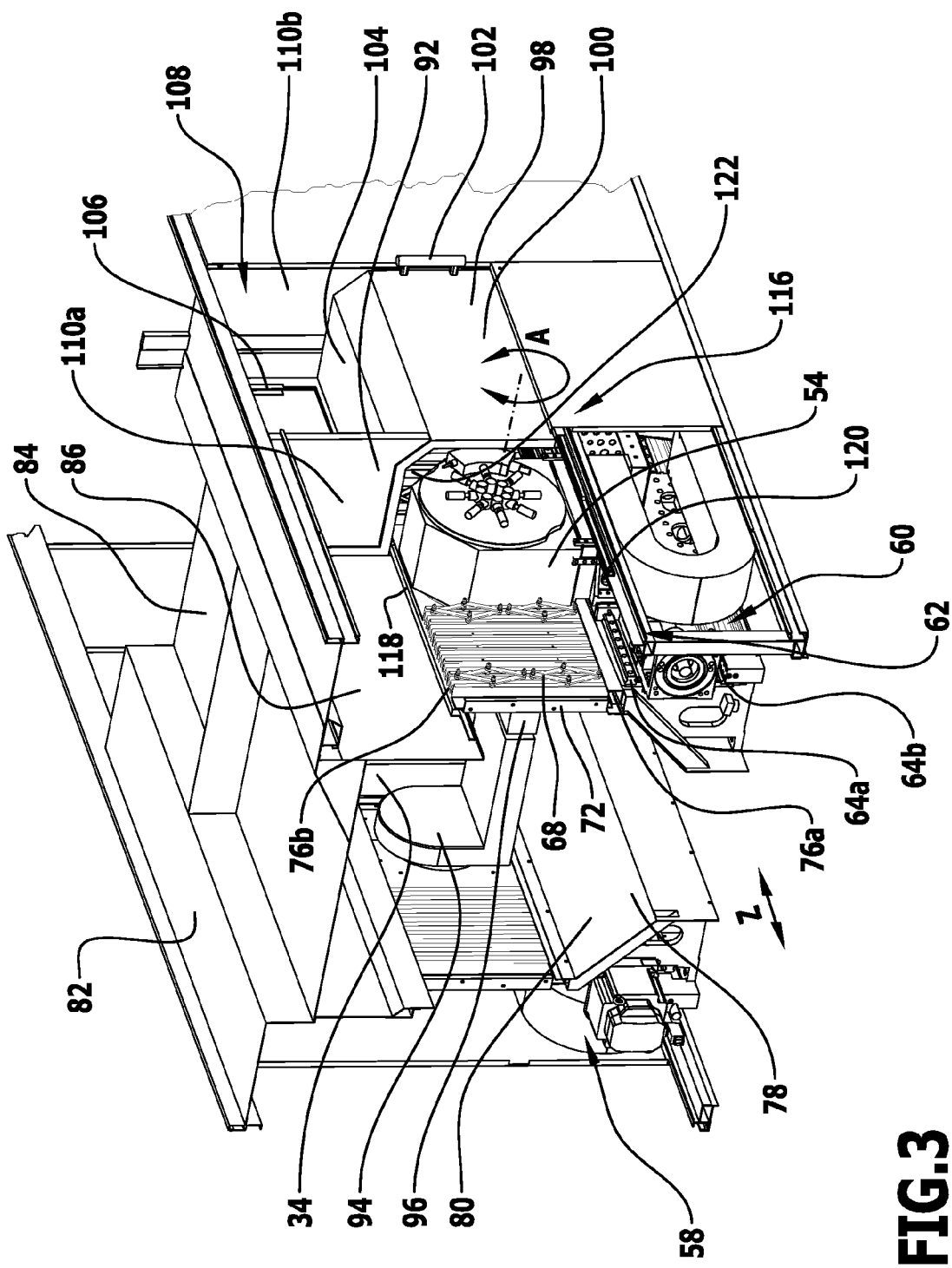
FIG. 3 shows the same view as FIG. 2 with the outer cladding partially removed.
Figure 4:
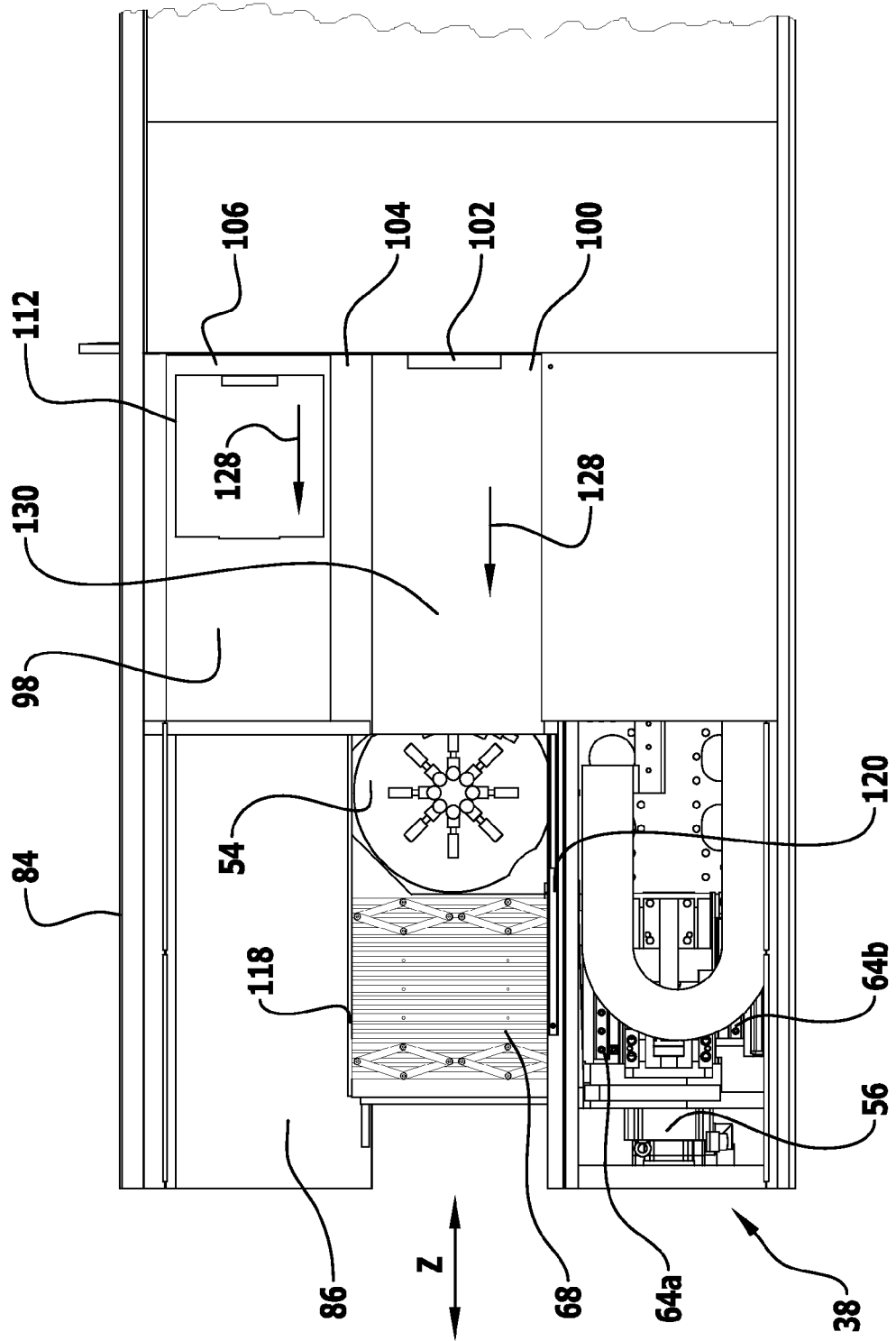
FIG. 4 shows a side view of the partial area according to FIG. 3.
Figure 5:
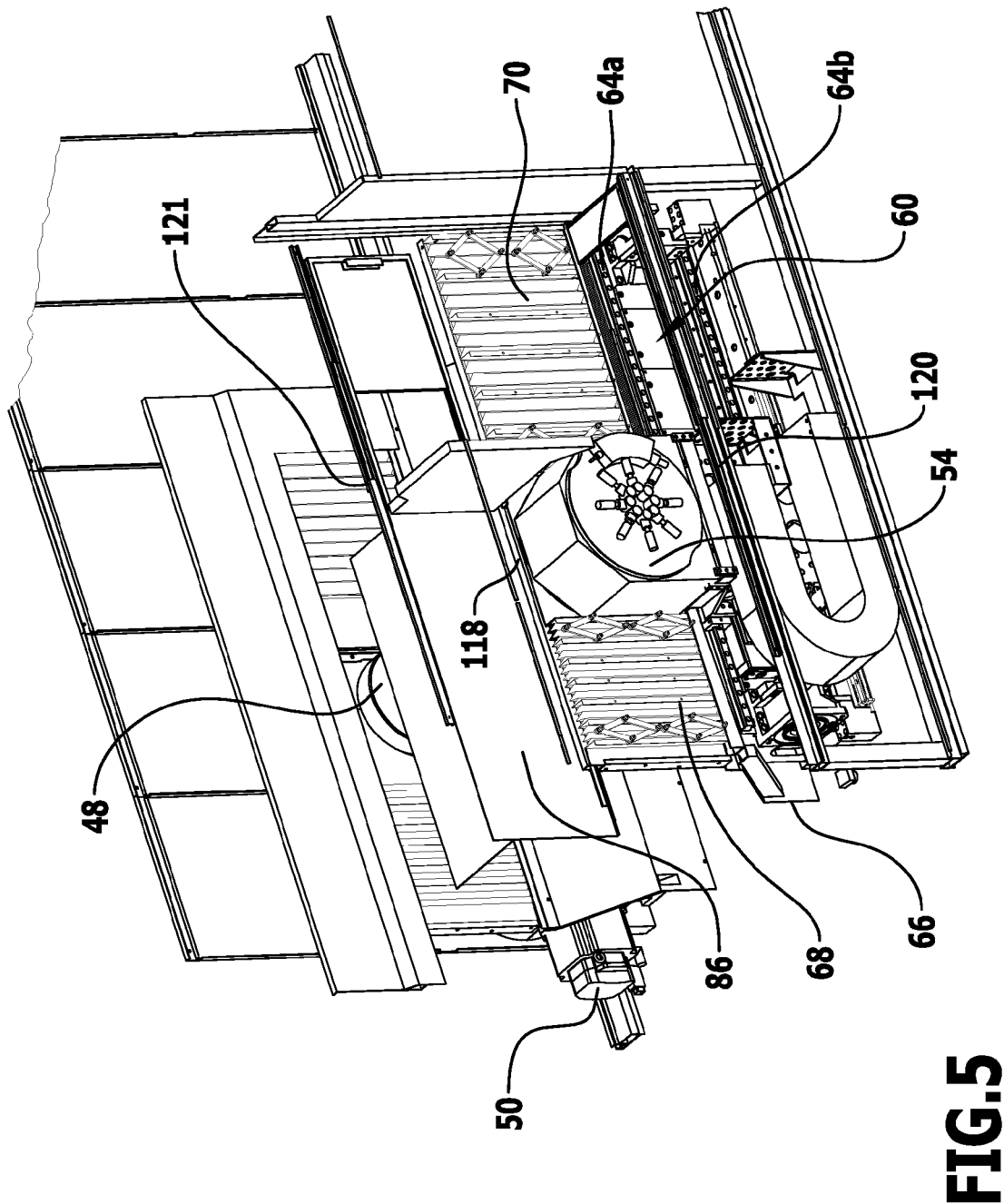
FIG. 5 shows a view similar to FIG. 3, with further parts of the outer cladding and parts of the work space cladding removed.
Figure 6:
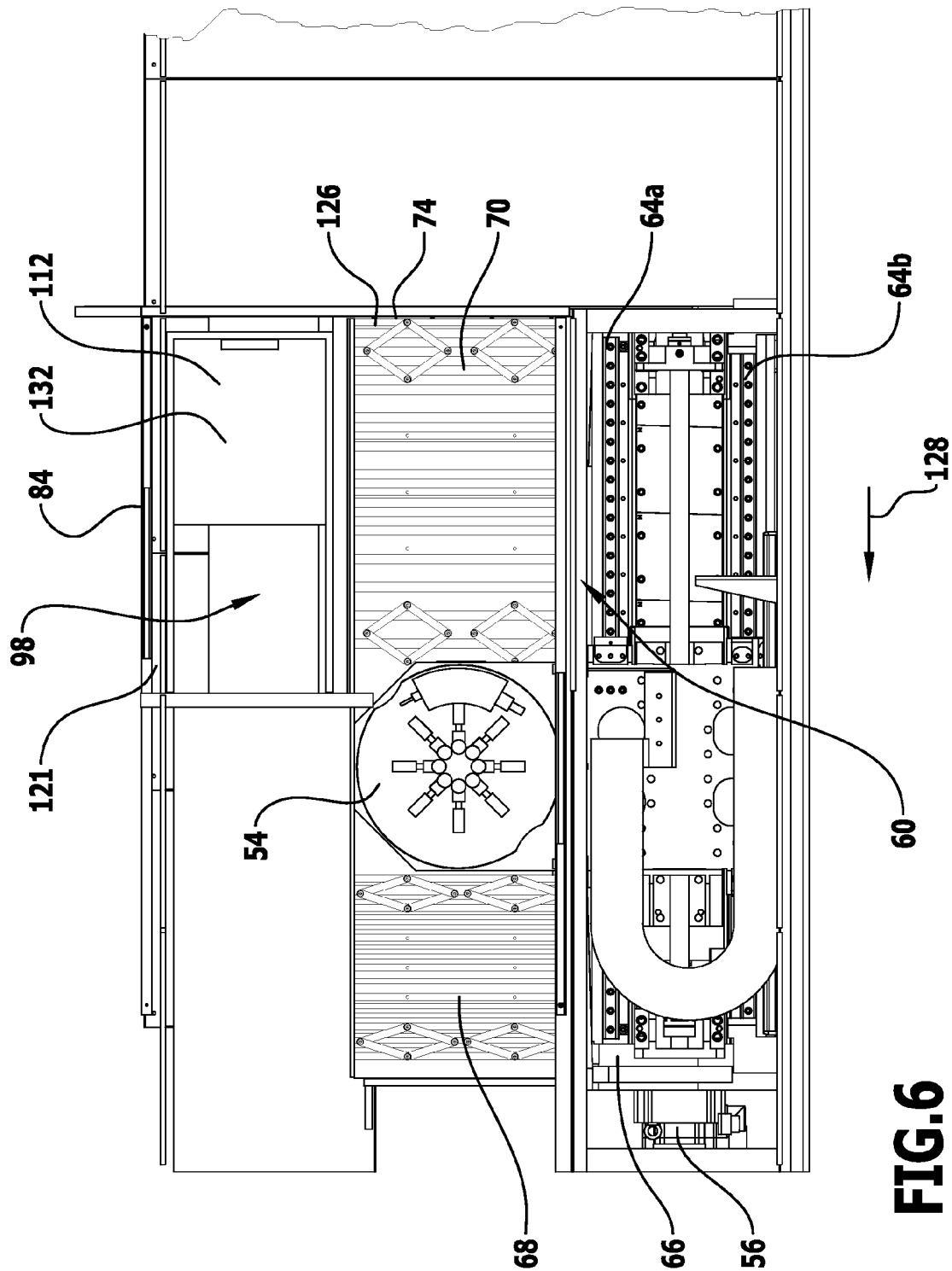
FIG. 6 shows a side view of the partial area according to FIG. 5.

The machine tool 10 also has an outer cladding 88 (FIG. 2). The outer cladding 88 may partly coincide with the work space cladding 82. In particular, the roof portion 84 of the work space cladding 82 forms an outer cladding.

In the area of the path guiding devices 58 and 60 there is an outer cladding portion 90, which is spaced from the work space cladding portion 86 and, in particular, is spaced therefrom parallel thereto. The corresponding path guiding device 58 and 60 is encapsulated in relation to the outside space by this outer cladding portion 90. The corresponding outer cladding portion 90 preferably extends from the machine bed 12 to the roof portion 84.

Arranged between the outer cladding portion 90 and the work space cladding portion 86 is a space 92 (intermediate area) in which, in turn, the corresponding path guiding device 58 and 60, respectively, is at least partially arranged.

The first workpiece carriage 48 and the second workpiece carriage 54 each carry a first workpiece holder 94 and a second workpiece holder 96. One or more workpieces are fixable to each of these. The first workpiece holder 94 and the second workpiece holder 96 are rotatable about an axis A on the associated first workpiece carriage 48 and second workpiece carriage 54, respectively. To this end, a corresponding rotary drive is seated on the first workpiece carriage 48 and on the second workpiece carriage 54.

The axis A is aligned transversely and, in particular, perpendicularly to the z direction (direction of displacement of the workpiece carriages 48 and 54) and parallel to the x direction.

The axis of rotation A is a horizontal axis.

If the first workpiece carriage 48 and the second workpiece carriage 54 are clamped together, then the first workpiece holder 94 and the second workpiece holder 96 are also correspondingly clamped together. These are then rotatable about the common axis of rotation A. In this sense, the first workpiece holder 94 and the second workpiece holder 96 can then be regarded as a joint (single) workpiece holder on which, for example, a large workpiece or a plurality of workpieces may be fixed.

For access to the work space 34 from the side (at least) one sliding door 98 is provided. This sliding door 98 lies between the front end 38 and the machine frame 14. Workpieces are brought into the work space 34 from the front end 38 and removed from the front end. A front loading or top loading may be provided, but the corresponding load openings are arranged in the area of the front end 38. The sliding door 98 serves for access to the work space from the side, for example, to carry out repair and maintenance work.

The sliding door 98 is arranged on a path guiding device. In the embodiment shown, the sliding door 98 is arranged on the second path guiding device 60.

The sliding door 98 comprises a first door element 100 which is orientated substantially parallel to the outer cladding portion 90. A door handle 102 is, for example, arranged on the first door element 100.

Arranged on and fixedly connected to the first door element 100 is a second door element 104 which is orientated transversely thereto. The second door element 104 is, for example, orientated perpendicularly to the first door element 100. An area of transition may be provided.

The first door element 100 serves to cover the path guiding device 60 towards the outside space, namely in a lateral direction. The second door element 104 serves to cover the second path guiding device 60 upwards.

Arranged on the second door element 104 is a third door element 106, which is orientated transversely to the second door element 104 and, in particular, is orientated substantially parallel to the first door element 100. The third door element 106 is spaced from the first door element 100. The combination of first door element 100, second door element 104 and third door element 106 has in cross section, for example, an at least approximately Z-shaped configuration or the shape of a double L.

The third door element 106 delimits the work space 34. The third door element 106 has an inner side which is a delimiting wall of the work space 34. An opposite outer side faces into the outside space.

A recessed area 108 is formed at the outer cladding 88 in the area of the closed sliding door 98. This recessed area is so configured that access to the work space 34 is possible from the outside space.

The recessed area 108 is delimited in relation to the z direction by opposed portions 110a, 110b of the outer cladding 88 which are spaced from each other. These portions 110a and 110b are orientated transversely and, in particular, perpendicularly to the outer cladding portion 90. The portions 110a and 110b are formed by one or more corresponding panels.

The recessed area 108 is delimited upwards by the roof portion 84 of the work space cladding 82.

Arranged on the third door element 106 is a door such as a sliding door 112, which enables direct access to the work space 34. A swing door may also be provided. In particular, the sliding door 112 is so arranged on the third door element 106 and so constructed that its range of displacement is limited to the third door element 106. Therefore, when the sliding door 98 is in the closed position 114, the work space 34 can be accessed through the sliding door 112.

A sensor device for detecting whether the door is open may be associated with the corresponding door for the "small access". For example, a safety shutdown of the machine tool can then be initiated.

A direction of displacement of the sliding door 112 on the sliding door 98 is substantially parallel to the z direction.

Alternatively or additionally, a window through which the work space is observable may be arranged on the third door element 106.

The sliding door 98 with its first door element 100, second door element 104 and third door element 106 is guided for displacement on the second path guiding device 60, the direction of displacement being parallel to the z direction. A corresponding guiding device 116 is provided for guiding the displacement. This comprises a guide rail 118 which is arranged at or in the vicinity of the guide rail 76b for the first slide 68 and the second slide 70 or is formed thereon. It further comprises a guide rail 120 which is arranged in spaced relation to the guide rail 76a in the y direction. It also comprises a guide rail 121 which is arranged on the roof portion 84.

During the transition between an open position and a closed position and vice versa, the third door element 106 is guided above the guide rail 118 by the guiding device 116. The second door element 104 and the third door element 106 are guided on the guide rail 118 and on the guide rail 120.

The sliding door 98 with the second door element 104 and the third door element 106 is so constructed that in the closed position 114 of the sliding door 98 the corresponding workpiece carriage (in the example shown the second workpiece carriage 54) can pass during its displacement through a transit space 122. The transit space 122 is delimited upwards by the second door element 104 and laterally by the first door element 100 for guiding the path of the workpiece carriage 54 during workpiece machining and/or workpiece feed/workpiece removal into a machining position/out of a machining position.

Via this transit space 122, the sliding door 98 can, upon opening, be slid over the second workpiece carriage 54.

The space 92 between the work space cladding portion 86 and the outer cladding portion 90 is provided for receiving the sliding door in its open position 124. In this open position, the major part of the first door element (up to the door handle 102), of the second door element 104 and of the third door element 106 has entered this space 92. Therefore, substantially the entire recessed area 108 between an upper side and a lower side (which is substantially delimited by the guide rail 120) is available for access to the work space 34. However, the guide rail 118 is arranged in the recessed area 108.

It may be provided that the corresponding part of the guide rail 118 is of removable or telescopic construction in order to obtain a larger area of access.

The second slide 70 is connected by a fixing device 126 to the end area 74 of the corresponding path guiding device. The fixing device 126 is so constructed that the fixing of the second slide 70 to the end area 74 is releasable. The second slide 70 can then be displaced in a direction 128 (FIG. 6), which is parallel to the z direction and points from the rear end 40 to the front end 38, in order to provide an access opening from the outside space into the work space 34, which lies in the area of the path guiding device 60.

The sliding door 98 can be brought from the open position 124 into the closed position 114 by sliding it in the direction opposite to the direction 128. By sliding it in the direction 128, it can be brought from the closed position 114 into the open position 124.

The machine tool 10 according to the invention operates as follows:

The work space 34 is encapsulated in relation to the outside space while the workpieces are being machined. It is also encapsulated in the direction towards the front end 38 (for illustrative reasons not shown in the drawings).

The first workpiece holder 94 and/or the second workpiece holder 96 holds (at least) one workpiece which is fed to the (at least one) tool holder device 32 for machining by the tool.

It is possible for only one workpiece holder (and hence only one workpiece carriage) to be activated or for two workpiece carriages to be activated during the workpiece machining inside the work space 34. They may be activated separately from each other or they may be clamped to each other so as to form a workpiece carriage combination.

It may also be provided that a workpiece carriage is used to hold in readiness outside the work space a workpiece which is to be machined, while a workpiece is being machined by means of the other workpiece carriage.

If an access to the work space 34 is required, for example, for carrying out maintenance and repair work, then the corresponding workpiece carriage (for example, the second workpiece carriage 54) is driven into a position in which it does not cover an opening 130 into the work space 34, which is provided by the sliding door 98. In particular, it is driven in the direction of the front end 38 if it is not already located there.

The sliding door 98 is opened in the direction 128. The major portion of the sliding door 98 thereby passes into the space 92.

The second slide 70 is released from the end area 74 by the fixing device 126 and also displaced in the direction 128.

Optionally, a partial area of the guide rail 118, which lies at the opening 130, may also be dismantled. This partial area of the guide rail may, for example, also be telescopic so as to be slidable out of the opening 130.

A large area of access to the work space 34 is thereby provided via the opening 130.

The opening 130 is closed again by sliding in the direction opposite to the direction 128. (The second slide 70 is first fixed at the end area 74 again by the fixing device 126.)

Access via an opening 132 is also possible by means of the sliding door 112 or a swing door. This is a "small" access. The surface area of the opening 132 is smaller than that of the opening 130.

The invention claimed is:

1. Machine tool, comprising:
   a machine frame;
   at least one tool holder device which is held for movement on the machine frame;
   a work space in which workpieces are machinable;
   a work space cladding;
   at least one workpiece carriage which is displaceable on a path guiding device relative to the machine frame, the path guiding device being arranged alongside the work space; and
   at least one sliding door for access to the work space, the sliding door being arranged on the path guiding device of the at least one workpiece carriage.

2. Machine tool in accordance with claim 1, wherein the at least one sliding door is displaceable parallel to a direction of displacement of the at least one workpiece carriage.

3. Machine tool in accordance with claim 1, wherein the at least one sliding door delimits a transit space for passage of the corresponding workpiece carriage therethrough.

4. Machine tool in accordance with claim 1, wherein the at least one sliding door is arranged between a front end of the machine tool and the machine frame.

5. Machine tool in accordance with claim 1, wherein a recessed area at which the at least one sliding door is arranged, at least in the closed position, is provided at an outer side of the machine tool.

6. Machine tool in accordance with claim 1, wherein at least one window or door is arranged on the least one sliding door.

7. Machine tool in accordance with claim 6, wherein the at least one door is a sliding door or a swing door.

8. Machine tool in accordance with claim 6, wherein the at least one door has an opening area that is located on the associated sliding door.

9. Machine tool in accordance with claim 1, wherein the at least one sliding door has a first door element which covers the path guiding device towards the outside space.

10. Machine tool in accordance with claim 9, wherein the path guiding device lies between the work space and the first door element.

11. Machine tool in accordance with claim 9, wherein the at least one sliding door has a second door element which is arranged on and orientated transversely to the first door element, and which covers the path guiding device upwards in relation to the direction of gravity towards the outside space.

12. Machine tool in accordance with claim 11, wherein the first door element lies between the path guiding device and a roof portion of an area of the machine tool that is recessed in relation to the outside space.

13. Machine tool in accordance with claim 11, wherein the at least one sliding door has a third door element which is arranged on and orientated transversely to the second door element.

14. Machine tool in accordance with claim 13, wherein the third door element extends as far as a roof portion of the work space cladding.

15. Machine tool in accordance with claim 13, wherein the third door element is orientated at least approximately parallel to the first door element.

16. Machine tool in accordance with claim 13, wherein at least one window or door is arranged on the third door element.

17. Machine tool in accordance with claim 13, wherein the third door element delimits the work space.

18. Machine tool in accordance with claim 1, wherein the at least one sliding door is held for displacement on the path guiding device.

19. Machine tool in accordance with claim 1, wherein at least one movable slide, which covers the path guiding device off from the work space, is arranged on the at least one workpiece carriage and at an end area of the associated path guiding device.

20. Machine tool in accordance with claim 19, wherein the at least one slide is arranged between the work space and a partial area of the at least one sliding door.

21. Machine tool in accordance with claim 19, wherein a fixing device for fixing the at least one slide to the associated workpiece carriage or to the end area of the associated path guiding device is so constructed that the fixing is releasable from the outside space when the at least one sliding door is open.

22. Machine tool in accordance with claim 1, wherein the at least one sliding door, upon opening, passes into an area behind an outer cladding of the machine tool.

23. Machine tool in accordance with claim 1, wherein the path guiding device is arranged between a portion of the work space cladding and an outer cladding of the machine tool.

24. Machine tool in accordance with claim 23, wherein the at least one sliding door, upon opening, passes into a space between a work space cladding portion and the outer cladding.

25. Machine tool in accordance with claim 1, wherein a guiding device is provided for sliding guidance of the at least one sliding door.

26. Machine tool in accordance with claim 25, wherein the guiding device is at least partially arranged or formed on the associated path guiding device.

27. Machine tool in accordance with claim 26, wherein at least one guide rail for the at least one sliding door is arranged and/or formed on a guide rail for at least one slide which is connected to the at least one workpiece carriage.

28. Machine tool in accordance with claim 26, wherein at least one guide rail for the at least one sliding door is arranged at or in the vicinity of an outer side of the path guiding device of the at least one workpiece carriage.

29. Machine tool in accordance with claim 1, wherein a first workpiece carriage is displaceable on a first path guiding device, and a second workpiece carriage is displaceable on a second path guiding device, and the work space lies between the first path guiding device and the second path guiding device.

30. Machine tool in accordance with claim 29, wherein a direction of displacement of the first workpiece carriage and a direction of displacement of the second workpiece carriage are parallel to each other.

31. Machine tool in accordance with claim 29, wherein a connecting device is provided for clamping the first workpiece carriage and the second workpiece carriage together.

32. Machine tool in accordance with claim 29, wherein the first workpiece carriage has a first drive of its own associated with it, and the second workpiece carriage has a second drive of its own associated with it.

33. Machine tool in accordance with claim 1, wherein the at least one tool holder device is displaceable in at least a first direction and a second direction perpendicular to the first direction on the machine frame.

34. Machine tool in accordance with claim 1, wherein the machine frame is arranged on a machine bed.

35. Machine tool in accordance with claim 1, wherein the at least one path guiding device is arranged on the machine bed.

36. Machine tool in accordance with claim 1, wherein a workpiece holder which is rotatable about an axis of rotation is arranged on the associated at least one workpiece carriage.

37. Machine tool in accordance with claim 36, wherein the axis of rotation is orientated transversely to a direction of displacement of the at least one workpiece carriage.

* * * * *